Feb. 8, 1966 P. KUTTNER 3,234,372

FULL ADDER USING THIN MAGNETIC FILMS

Filed July 17, 1961 2 Sheets-Sheet 1

*INVENTOR.*
PETER KUTTNER

*BY* G. Donald Weber, Jr.

AGENT

Feb. 8, 1966 P. KUTTNER 3,234,372

FULL ADDER USING THIN MAGNETIC FILMS

Filed July 17, 1961 2 Sheets-Sheet 2

INVENTOR.
PETER KUTTNER

BY G. Donald Weber, Jr.
AGENT

3,234,372
FULL ADDER USING THIN MAGNETIC FILMS

Peter Kuttner, Philadelphia, Pa., assignor to Sperry Rand Corporation, New York, N.Y., a corporation of Delaware Filed July 17, 1961, Ser. No. 124,717
9 Claims. (Cl. 235—176)

This invention relates to a circuit device for performing a logic function. In particular, the device performs full additions and uses thin magnetic films as the active elements.

The operations of full-adders, which is the class of logic circuits within which the instant device falls, is known in the art. These devices find much application as arithmetic circuits used in digital computers and the like. Briefly, a full adder provides a sum output signal, a carry output signal, or both in response to the signal conditions at three separate inputs. One of these three inputs may in actuality represent the carry output from a previous addition performed by a similar type of device. More particularly, the full adder operates such that there is neither a sum nor a carry output signal when no input signals are applied. In the event that an input signal is applied to any one of the input terminals, a sum output signal is provided while no output signal is produced at the carry output terminal. Similarly, if two inputs are simultaneously applied at any two of the input terminals, a carry output signal is provided while no sum output signal is produced. Finally, in the event that signals are simultaneously applied at all three of the input terminals, output signals are provided at both the sum output terminal and the carry output terminal. The function table for a typical full-adder circuit is reproduced below:

| Inputs | | | Outputs | |
|---|---|---|---|---|
| A | B | C | Sum | Carry |
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

In digital computers and similar business machines which are being produced at present, the trend is to microminiaturization in order to reduce both space and power requirements. In order to effect this microminiaturization, it has been proposed to use thin magnetic films as the active elements in circuits and the like. In view of this proposition, there has been a great deal of activity in the production of many different thin magnetic films having different characteristics. However, in order to utilize the full benefits of the microminiaturization provided by thin magnetic films, there must be provided circuits and devices which can utilize these thin magnetic films to produce the various logic functions (as well as other functions) which are necessary in the operation of business machines. One of the many logic circuits used in these types of machines is the full-adder which functions as discussed supra. Therefore, it would be advantageous to produce a full-adder circuit utilizing thin magnetic films for use in a microminiaturized machine.

In the research on thin magnetic films which has been pursued at the laboratories of Remington Rand Univac, there have been developed a number of new films. At least one of these films is characterized by having so called "ranges of activity." Each of these ranges is defined by at least a lower threshold value and, in some cases, by an upper threshold value or level. The threshold values relate to the magnitude of the driving field H, applied to the thin film and the prior history of the film. Thus, if the driving field, H, has a magnitude below a certain first threshold value for example, 2 oersteds, there will be no magnetic activity or change within the thin film and the film remains as it existed prior to the application of the H field. If, however, the driving field, H, has a magnitude above the aforementioned first threshold (2 oersteds) but below a second threshold, for example 4 oersteds, magnetic domain walls, if any, within the thin films will be moved. That is, the magnetic moment of the various domains will attempt to become aligned with the driving force H. In the event that the driving force, H, exceeds the second threshold value (4 oersteds), but not a third threshold value, for example 6 oersteds, domain walls will be created or nucleated in the usual manner. Clearly, it is understood that any domain walls nucleated, or initially present, will be moved by this magnitude driving force. Finally, should the driving force, H, exceed the third threshold value (6 oersteds) all domain walls in the thin film will be destroyed and the film may be considered to be saturated in one direction.

It is clear that these driving forces, which are illustrative only, may be applied to the thin films by wires carried on an adjacently mounted printed circuit card or board or the like, for carrying the wires. Currents of proper magnitudes may be passed through the wires to produce the forces which cause the thin magnetic films to assume certain conditions. Subsequently, the condition of the film may be sampled by means of another adjacently mounted wire on the card thereby producing a signal which indicates the state or condition of the magnetic film.

By utilizing a plurality of thin magnetic films having a threshold characteristic, but having different threshold values, it may be seen that a full-adder may be effected by having the results of the sampling of the various films indicate the presence or absence of input signals and/or combinations thereof. A description of these films and the process for fabrication thereof may be found in any one of the copending applications by Arnold Schmeckenbecher and identified as Metal Chelate Polymers, Serial No. 39,830; Variable Axis Magnetic Films, Serial No. 40,008, now Patent Number 3,124,490; and Method of Producing Magnetic Films, Serial No. 39,775, now abandoned.

Clearly, one object of this invention is to provide a logical circuit for performing full addition.

Another object of this invention is to utilize thin magnetic films in circuits for performing logical functions.

Another object of this invention is to provide a full-adder circuit using thin magnetic films wherein there is no necessity for biasing the films to a predetermined condition.

Another object of this invention is to provide a thin magnetic film circuit device using thin magnetic films having threshold characteristics.

Another object of this invention is to provide a miniaturized full-adder circuit for use in business machines and the like.

Another object of this invention is to provide a logic circuit having low power requirements.

These and other objects and advantages of the invention will become apparent upon the reading of the following description in conjunction with the attached drawings in which.

Figure 1:
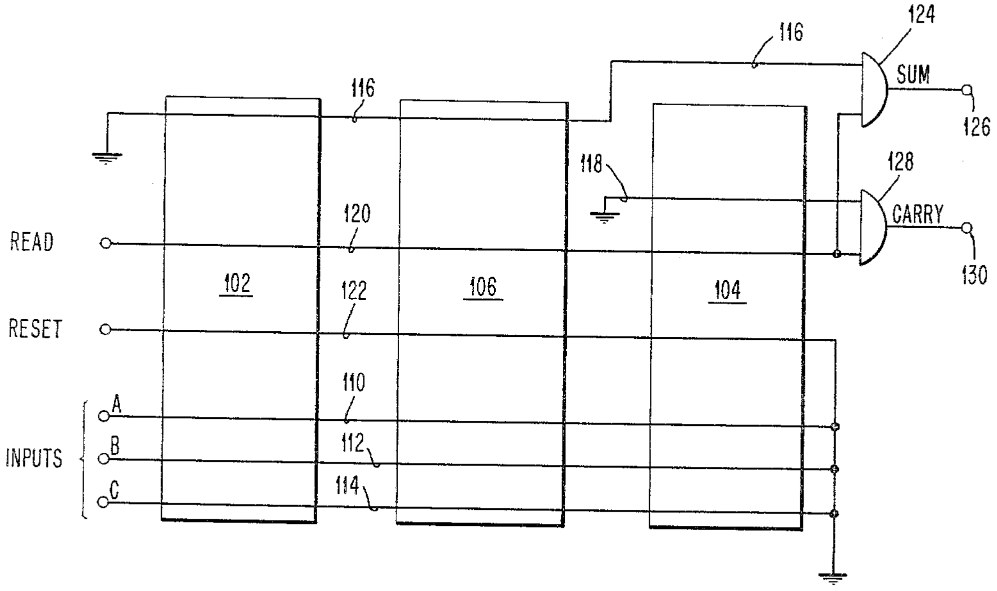
FIGURE 1 is a schematic diagram of a full adder circuit utilizing thin magnetic films.

Referring now to FIGURE 1, there are shown three films designated as film 102, film 104 and film 106. Each of these films is characterized by the threshold characteristic previously described. The methods for fabrication of these films are described in the aforementioned copending applications of Schmeckenbecher. Moreover, these films may be deposited upon any suitable substrate in accordance with the fabrication methods disclosed in the Schmeckenbecher applications. Also, the thickness and the surface dimensions of the thin films are determined by the method used in the fabrication.

It will be seen that each of the films is linked by a plurality of conductors. These conductors may comprise thin wires which are wrapped around each of the films individually. In the alternative, and in a preferred embodiment, the conductors may be in the form of printed circuit conductors. For example, fine line etching techniques permit sufficiently close arrangement of conductors that there would be no problem in mounting the wires adjacent the films.

In particular, the conductors 110, 112 and 114 represent input wires. These wires are designated further by having input signals A, B and C applied thereto, respectively. It is to be understood, of course, that the input signals may be supplied by an previous circuitry, including other logical full-adders such as that described herein.

The conductors 116 and 118 are sum and carry conductors, respectively. The carry conductor links only film 104 and sum conductor 116 links only films 102 and 106. These conductors are connected to gates 124 and 128 respectively. These gates may be AND gates so that an output is derived therefrom only with the simultaneous application of a sensed signal and a strobe signal. The strobe signal is supplied by the read conductor described infra. The gates are connected to external circuitry, for example a further full-adder of the type described, or other logic circuitry (via amplifying circuits if necessary) to provide output signals from the instant full-adder circuit at terminals 126 and 130.

Two other conductors, namely conductors 120 and 122, link all of the films. Conductor 120 is the read conductor and conductor 122 is the reset (or erase) conductor. The read and reset conductors are each connected to signal producing means, not shown, preferably of a type which produces regularly recurring signals. This requirement is not necessary for operation of the device, but is rather more easily implemented than an asynchronously pulsed device. Moreover, as suggested supra, conductor 120 is connected to gates 124 and 128. These gates are rendered operative only with the application of a read signal coincidentally with a signal produced on conductors 116 or 118.

Figure 2:
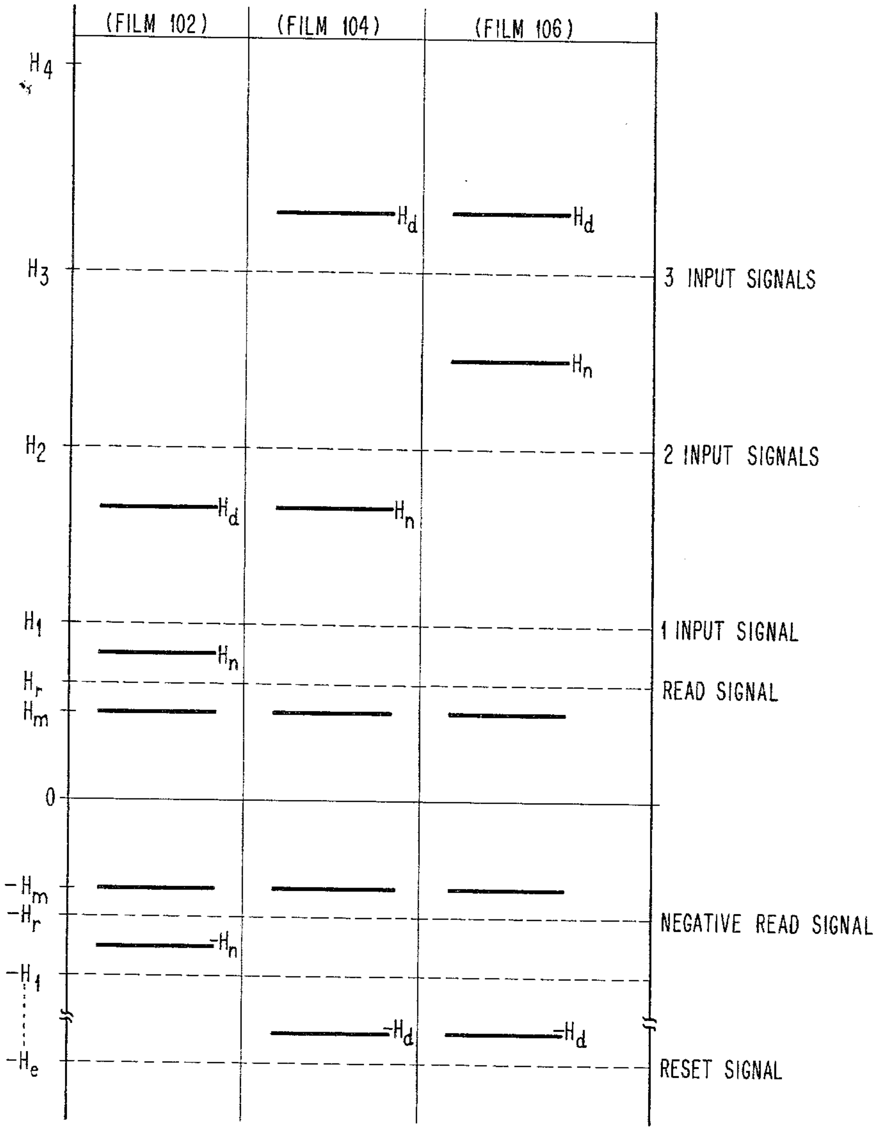
FIGURE 2 is a graphic showing of the threshold values which define the regions of different magnetic conditions of the various films.

Referring now to FIGURE 2, there is graphically shown a chart which has threshold values for each of the films. Moreover, this chart shows the threshold values of each of the films relative to the threshold values of the other films.

Briefly, the threshold may be designated as follows:

$H_m$=the driving force threshold which when exceeded causes movement of magnetic domain walls.

$H_n$=the driving force threshold which when exceeded causes nucleation of domain walls.

$H_d$=the driving force threshold which when exceeded causes domain walls to be destroyed.

It will be seen that for film 102 (as well as the other films) there are three threshold values. Moreover, it is to be understood that there are associated positive and negative thresholds for the films. The region between the threshold values $H_n$ and $H_d$ (positive or negative) represents the region wherein domain walls are nucleated due to energy derived from the applied driving field if the films are initially assumed to be in the reset condition, which produced by the application of a reset signal described infra. Thus, in the case of film 102 if a single input signal is applied to one of the input wires 110, 112 or 114, a driving force of magnitude $H_1$ is created within the films. As is shown in FIGURE 2, a driving force having a magnitude of $H_1$ exceeds the threshold $H_n$ for film 102. Thus, a driving force $H_1$ nucleates domain walls within film 102 and film 102 is in the "one" condition. However, the magnitude of driving force $H_1$ is below the $H_n$ threshold values for both of films 104 and 106. Therefore, there is no effect on these films by the driving force $H_1$ produced by a single input signal and they remain in the initial reset or erased condition which is similar in effect to a "zero" condition. It may be noted that in the reset condition, the films produce the same output (or lack thereof) as in the case of a written in zero. However, the "write 0" signal is opposite in polarity from the erase signal and causes a "magnetic history" in the film whereby further writing into the film cannot be effectively accomplished.

If two input signals are now applied to any two of input lines 110, 112 and 114, a driving force having the magnitude $H_2$ is produced. Clearly, this driving force is sufficiently large to exceed the $H_n$ threshold in film 104. Therefore, domain walls are nucleated within the film 104 and the film assumes the "one" condition. Once again, the driving force $H_2$ is insufficient to exceed the threshold $H_n$ of film 106 and, therefore, no change occurs therein so that film 106 remains aligned, as before, in the reset, or effective "zero" condition. However, the driving force $H_2$ will be seen to exceed the threshold $H_d$ of film 102. The application of the driving force $H_2$ to film 102 is therefore effective to destroy any domain walls which may have been previously nucleated within thin film 102. Thus, film 102 is now in the "zero" condition.

Finally, in the event that input signals are applied to each of input lines 110, 112 and 114, a driving force having a magnitude $H_3$ is supplied to the thin films. As shown, the application of a driving force having the magnitude $H_3$ is within the range (between $H_n$ and $H_d$) wherein domain walls are nucleated within thin films 104 and 106. Thus, films 104 and 106 are each aligned in the "one" condition. Moreover, $H_3$ is still greater than the threshold value $H_d$ of film 102 which remains aligned in the "sero" condition. In the event that a further signal were to be supplied thereby producing a driving force having a magnitude greater than the $H_d$ threshold shown for films 104 and 106, the domain walls therein would be destroyed. This operation is not, per se, contemplated in the embodiment shown in FIGURE 1 since this would effectively write "zeroes" into each of the films and effectively prohibit further writing of ones thereinto. It should be understood that this type of operation is possible with these types of films but not necessary in the embodiment shown because of the preferred method of applying a reset signal as described infra.

With the application of a read signal to read conductor 120, a driving force $H_r$ is produced. It should be noted that the magnitude of driving force $H_r$ should be such that it exceeds the threshold $H_m$ for each film but does not exceed the threshold $H_n$ for film 102 (the lowest $H_n$ threshold value). The driving force $H_r$, since it exceeds the threshold $H_m$ is sufficient to cause motion of domain walls within the thin magnetic films. This motion may be sensed by one of the sense windings 116 and 118 (sum and carry conductors, respectively). That is, the motion of the domain walls creates a magnetic field which moves relative to and across, the conductors 116 and 118. This phenomenon produces a voltage in the conductor which may be detected by any known means (not shown).

In addition, it may be seen that provision is made for the application of a reset or erase signal. The reset signal must have a magnitude which is larger than the $H_d$ threshold for all of the films in order to destroy all domain walls in the several films. Thus, the reset signal requires a driving force having a magnitude on the order of $H_4$ as shown in FIGURE 2. Moreover, this reset signal is applied in the opposite direction relative to the write-in and read signals previously applied. That is, the reset signal effectively creates a single domained film which may be considered as having its magnetic moment in one direction. In order to produce a significant output signal, the magnetic moment of the domains in the film must be moved. Therefore, since the driving signals are defined as being oppositely directed from the reset signals, the magnetic moment of the film is reversed 180° by a drive signal which produces the largest possible output signal.

A negative read signal magnitude is also shown. This signal need not be used, but in the event that the full adder circuit is to be used as a non-destructive read out circuit, i.e., having memory characteristics, this negative read signal is desirable. That is when the positive read signal is applied to the films, the films are driven along the respective B-H hysteresis characteristic (whether it be open or flat). By applying a negative signal, the films are returned to the original location or remanence condition on the B-H characteristic and proper functioning thereof is assured.

It should be noted that in the fabrication of the films difficulty may be encountered in providing the threshold arrangement as shown in FIGURE 2. That this exact threshold arrangement is not necessary should be understood. However, certain limitations suggested thereby must be met. For example, even though the $H_m$ threshold value in each of the films need not be exactly the same (as shown), the highest $H_m$ threshold value (probably in film 106) must still be below the minimum $H_n$ value (as shown in film 102). Moreover, there should preferably be a significant difference between the highest $H_m$ level and the lowest $H_n$ level in order that the read signal having a magnitude of $H_r$, may be comfortably interposed therebetween. That is, in the event that $H_m$ and $H_n$ are extremely close, the tolerances required on the read signal and driving force $H_r$ may become unduly burdensome.

The necessity for maintaining the highest $H_m$ level below the lowest $H_n$ level should be obvious since the $H_r$ signal must exceed the $H_m$ level in order to permit reading of the films. However, the $H_r$ cannot exceed the $H_n$ level without causing spurious and erroneous nucleation of domain walls in the associated films. In other words, the $H_r$ signal must be capable of exceeding the $H_m$ levels in each of the films thereby to produce domain wall motion therein so that a signal may be sensed by the appropriate sense winding while not exceeding the $H_n$ level in any of the films which would simultaneously produce and move the domain walls therein thereby creating an erroneous output signal.

Furthermore, the relation of the $H_d$ thresholds to the $H_n$ threshold need not be exactly as shown in FIGURE 2, however, these thresholds must be similar with relation to the input signals as shown. Thus, film 102 must be changed only by the application of one input signal; film 106 must be changed only by the application of three input signals; and film 104 must be such that it can be changed by the application of either two or three input signals, but not one input signal. Clearly, the relationship of the threshold values to the input signals is the crucial consideration.

Figure 3:
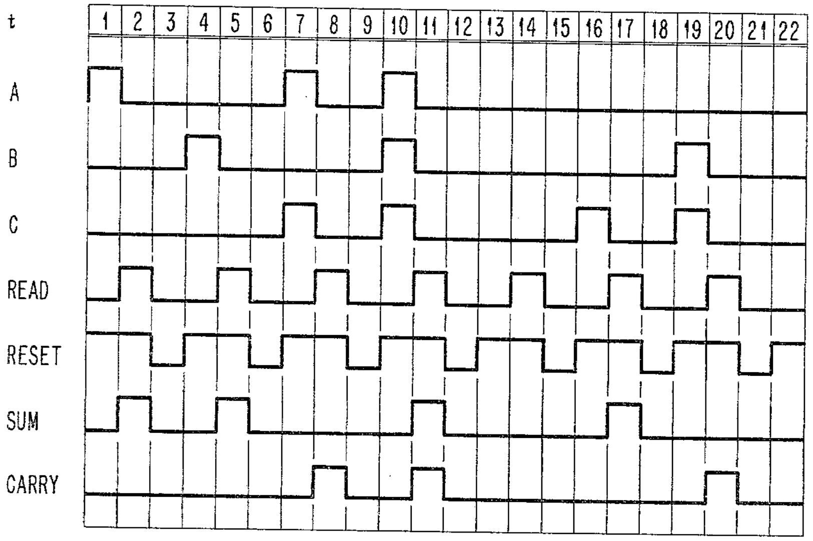
FIGURE 3 shows a timing diagram for the circuit comprised by the instant invention.

The operation of the circuit shown in FIGURE 1 utilizing the characteristics shown in FIGURE 2 will be understood more readily by referring to FIGURE 3. FIGURE 3 is a timing diagram for the circuit illustrated in FIGURE 1. It is assumed that initially each of the films 102, 104 and 106 are in the reset condition. That is, it is assumed that each of the films are in the one domain condition which is represented by the region between threshold value $H_n$ and threshold value $-H_n$. Thus, with the application of input signal A during time period T1, the magnetic condition of film 102 will be changed by the nucleation of domain walls therein and a "one" will be written in. Subsequently, with the application of the read signal to read conductor 120 during time period T2, the magnetic domain walls created within film 102 are caused to move as suggested supra. A signal is generated thereby on the sense conductor 116 which signal is applied to gate 124 along with a read signal on conductor 120 such that gate 124 indicates a sum output at terminal 126.

In view of the circuit operations as discussed supra, the fact that only one input signal is supplied to the films causes the change in the alignment in the thin magnetic film 102 but is not sufficient to cause the re-alignment of films 104 and 106. Consequently, in view of the fact that film 104 was aligned in the zero condition, no signal is sensed by carry conductor 118 during the application of the read signal to read conductor 120. Thus, as shown in FIGURE 3 the application of a single input pulse at time period T1 permits the production of a sum output signal during time period T2 in response to the application of a read signal during T2. The application of reset signal (having a magnitude greater than $-H_e$) during time period T3 causes the resetting of each of the films as described above. In actuality, this resetting is accomplished only in film 102 in view of the fact that neither film 104 nor film 106 was altered by the application of the single input signal A on conductor 110.

Due to the application of the reset signal during time period T3, each of the films again is in the initial "zero" (single domain) condition in the negative direction. Therefore, with the application of the single input signal B on conductor 112 during time period T4, again only film 102 will be aligned to be in the one condition with one or more domain walls therein. Consequently, with the application of the read signal on conductor 120 during time period T5 there will be produced again, only the sum output signal on conductor 116 and, consequently, at terminal 126. Again, the application of the reset signal during T6 replaces the films in the zero condition.

As shown in FIGURE 3, input signals are applied to two of the input conductors, for example conductors 110 and 114, during time period T7. It will be seen, by referring to FIGURE 2, that film 104 will have domain walls created therein and assume the "one" condition. On the other hand, however, film 102 will assume the "zero" condition due to the destruction of any domain walls because of the large magnitude of driving force $H_2$ produced by the input signals and film 106 will remain in the "zero" condition in view of the fact that the magnitude of the driving force produced by the input signals is not sufficient to produce domain walls within the latter film. Consequently, with the application of the read signal to conductor 120 during time period T8, the only domain wall motion which can be detected will be within the film 104. Consequently, the output signal produced will be on carry conductor 118 (the only sense conductor linked to film 104). This signal will be applied to gate 128 in coincidence with the read signal whereby a carry signal is produced at terminal 130. Inasmuch as neither film 102 nor 106 was switched into the "one" condition (including domain walls) during time period T8, there will be no signal produced in the sense winding associated therewith, namely conductor 116, during time period T8. Therefore, gate 124 will not produce a signal at terminal 126. Thus, with the application of two input signals it will be seen that a carry output signal is produced while no sum output signal is produced. Again, the reset signal re-aligns all of the films in the "zero" condition during time period T9.

During time period T10, it will be seen that input signals A, B and C are applied to the input conductors 110, 112 and 114, respectively. Moreover, by referring to FIGURE 2 it will be seen that the magnitude of the driving force produced by the application of all these signals is such that films 104 and 106 are both switched into the "one" condition. Thus, both films 104 and 106 now include a plurality of magnetic domains and the associated walls. With the application of the read signal during time period T11, the magnetic domains are moved in these films. As described supra, this wall movement of the magnetic domains creates a magnetic field which produces a voltage in the sense windings during time period T11. Referring to FIGURE 1 it will be seen that the voltage exists in both of the sense conductors, namely conductors 116 and 118, and is applied to gates 124 and 128 respectively. Thus, it will be seen, with the application of three input signals to the circuit, output signals will be derived at both the sum output 126 and the carry output 130. Again, the reset signal will re-align each of the films into the "zero" condition during time period T12 after the reading of the films.

During time period T13 it will be seen that there are no input signals applied to the circuit. Consequently, each of the films 102, 104 and 106 remains in the "zero" condition. Therefore, with the application of a read signal during time period T14 there is no output signal produced in view of the fact that the magnitude of the read signal is insufficient to create domain walls in the films. Moreover, since no walls have been previously created, there are no walls to be moved. The application of a reset signal during time period T15 is unessential in this case. However, in the preferred embodiment, a reset signal is applied by a clock arrangement or other regularly recurring pulse supplying source, and the reset pulse is as shown. Therefore, each of the films 102, 104 and 106 is once again (or still) in the "zero" condition.

Referring to the circuit operation during time periods T16–T21, it will be seen that these are merely repetitions of previously described situations. For example, during time period T16 there is applied a single input signal which produces a sum output signal during time period T17; and during time period T19 there are applied two input signals which produce a carry output signal during time period T20. Each of these operations has a counterpart which has been previously discussed.

It should be understood of course, that the embodiment described is illustrative only and is not limitative of the invention. For example, slight variations in the arrangement of the several conductors may be required (as, for example, an external loop of wire) in order to minimize possible mutual inductance parameters. Furthermore, if rotational switching of the magnetic moments in the films may be accomplished, the sense conductor may link the films perpendicularly to the driving conductors. Other variations of the circuit using the same principles are meant to be included within the scope of this description.

Having thus described the invention what is claimed is:

1. A logic circuit comprising three thin magnetic films, each of said films having different discontinuous hysteresis characteristics, three input conductors linked to each of said thin films such that the application of input signals to said input conductors may affect the magnetic domain conditions of predetermined ones of said films, a plurality of output conductors each of which is linked to less than all of said films for sensing the magnetic condition of said films and producing output signals in accordance therewith, a read conductor linked to each of said films such that the application of a read signal thereto produces signals on said output conductors in accordance with the magnetic condition of said films, said read signal having a magnitude smaller than the magnitude of said input signals, and separate gate means connected to each of said output conductors, each of said gate means being connected to said read conductor such that said gates produce output signals only in response to coincident signals applied by said read conductor and the associated output conductor.

2. A logic circuit comprising three magnetic thin films, each of said films being characterized by a hysteresis characteristic having a plurality of different thresholds, each of said thin films having a different hysteresis characteristic, three input conductors linked to each of said thin films such that the application of input signals to said input conductors may nucleate magnetic domain walls in predetermined ones of said films in accordance with the associated hysteresis characteristic thereof, a read conductor linked to each of said films such that the application of a read signal thereto causes said domain walls to move, a plurality of output conductors each of which is linked to less than all of said films for sensing the magnetic field produced by the motion of said domain walls in said predetermined ones of said films associated therewith and producing output signals in accordance therewith, and separate gate means connected to different ones of said output conductors, each of said gate means being connected to said read conductor such that said gates produce output signals only in response to coincident signals applied by said read conductor and the associated output conductor.

3. A logic circuit comprising three magnetic thin films, three input conductors linked to each of said thin films such that combinations of zero to three input signals may be applied to said films, a first one of said films being responsive only to a single input signal, a second one of said films being responsive either to two or three input signals, a third one of said films being responsive only to three input signals, the responsiveness of said films being characterized by the nucleation of magnetic domain walls therein, a first output conductor linked to only said first and third films for sensing the responsiveness of said films and a second output conductor linked to only said second film for sensing the responsiveness of said film, a read conductor linked to each of said films such that the application of a read signal thereto produces signals on said output conductors in accordance with the responsiveness of the associated films by causing said magnetic domain walls to move and thereby create a magnetic flux which is sensed by the associated output conductor, and different gate means connected to each of said output conductors, each of said gate means being connected to said read conductor such that said gates produce output signals only in response to coincident signals applied by said read conductor and the associated output conductor.

4. A magnetic switching circuit comprising a plurality of magnetic switching elements, each of said switching elements characterized by a different hysteresis characteristic defined by a plurality of discontinuous threshold values, means for applying different combinations of magnetizing forces to said elements tending to drive said elements through different regions of saturation, said force applying means including means for applying one of said forces only subsequent to the termination of others of said forces, and output means linked to said elements for deriving output signals in accordance with the change of flux in said output means only at the time of application of said one force.

5. An adder circuit comprising three thin magnetic film elements, said elements each exhibiting different hysteresis characteristics having distinct switching thresholds, means for applying driving forces to said elements, said driving forces being defined by the cumulative magnitude of current signals, a first element responsive to one and only one signal such that magnetic domain walls are created therein, a second element responsive to three and only three signals such that magnetic domain walls are created therein, a third element responsive to two or three signals such that magnetic domain walls are created therein, means for applying a read signal which causes motion of any domain walls in the films thereby producing a magnetic field, said read signal being smaller in magnitude than any current signal supplied by said means for applying driving forces, and means for sensing the magnetic field produced by the motion of said domain walls.

6. In combination, a plurality of thin magnetic film elements, said elements exhibiting a discontinuous hysteresis loop characterized by a plurality of distinct threshold levels, all of said films having a different first switching threshold, a first one of said elements having a second switching threshold which is not above the first switching thresholds of the other elements, a second one of said elements having a first switching threshold which is substantially above said second switching threshold of said first element and having a second switching threshold substantially similar to that of elements other than said first element, means for applying driving forces to said elements, said driving forces being effective to switch said elements in accordance with the magnitude of the driving forces relative to the associated thresholds, and means for producing output signals indicative of whether or not said elements have been switched.

7. A circuit comprising three magnetic thin films, each of said thin films exhibiting a different operating characteristic, three input conductors linked to each of said thin films such that combinations of zero to three input signals may be applied to said films, a first one of said films being responsive only to a single input signal, a second one of said films being responsive either to two or three input signals, a third one of said films being responsive only to three input signals, the responsiveness of said films being characterized by the nucleation of magnetic domain walls therein by the designated number of input signals such that the application of more than the designated number of input signals destroys existing domain walls and less than the designated number of input signals is ineffective to nucleate domain walls, a first output conductor linked to only said first and third films for sensing the responsiveness thereof and a second output conductor linked to only said second film for sensing the responsiveness thereof, a read conductor linked to each of said films such that the application thereto of a read signal which is smaller than one input signal and applied only subsequent to the termination of all applied input signals produces signals on said output conductors in accordance with the responsiveness of the associated films, said signals on said output conductors being a function of magnetic flux created by motion of any existing domain walls in response to said read signal, and different gate means connected to each of said output conductors, each of said gate means being connected to said read conductor such that said gates produce output signals only in response to coincident signals applied by said read conductor and the associated output conductor.

8. In combination, three magnetic thin films, each of said thin films exhibiting a different operating characteristic, said operating characteristic defining conditions of magnetic domain walls and no magnetic domain walls within said films, three input conductors linked to each of said thin films such that combinations of zero to three input signals may be applied to said films, a first one of said films being responsive only to a single input signal to nucleate domain walls therein, a second one of said films being responsive either to two or three input signals to nucleate domain walls therein, a third one of said films being responsive only to three input signals to nucleate domain walls therein, the responsiveness of said films being characterized such that the application of more than the designated number of input signals destroys existing domain walls and less than the designated number of input signals is ineffective to nucleate domain walls, said films exhibiting remanence to the extent that said conditions of domain walls and no domain walls are relatively permanent in the absence of additional signals to positively change the condition, a first output conductor linked to only said first and third films for sensing the operating condition thereof and a second output conductor linked to only said second film for sensing the operating condition thereof, a read conductor linked to each of said films such that the application thereto of a read signal which is smaller than one input signal and applied only subsequent to the termination of all applied input signals produces signals on said output conductors only when magnetic flux is created by motion of any existing domain walls in response to said read signal, and different gate means connected to each of said output conductors, each of said gate means being connected to said read conductor such that said gates produce output signals only in response to coincident signals applied by said read conductor and the associated output conductor.

9. In combination, a plurality of thin magnetic films, each of said films being characterized by a different discontinuous operating characteristic which is defined by a plurality of different threshold values and the regions therebetween, one of said regions exhibiting a plurality of domains separated by domain walls and the other regions exhibiting a single magnetic domain respectively, said film being operative to store information therein in accordance with the region of operation, a plurality of drive lines linked to each of said films to carry signals for driving said films along the operating characteristic thereof, and to nucleate domain walls therein only if the driving signals lie within the critical thresholds, a read line linked to each of said films to carry signals only subsequent to the termination of said driving signals for generating output signals in accordance with the condition of said films relative to the region of said operating characteristic wherein said films reside, said signals for generating output signals being smaller than all of said driving signals so that domain walls are not nucleated but existing domain walls are moved, and a plurality of output lines each linked to less than all of said films to carry the output signals generated by said read line signals, said output signals being a function of the flux produced by the motion of any existing magnetic domain walls.

References Cited by the Examiner

UNITED STATES PATENTS

| | | | |
|---|---|---|---|
| 2,696,347 | 12/1954 | Lo | 235—176 |
| 2,930,530 | 3/1960 | Saxby et al. | 235—176 |
| 3,014,661 | 12/1961 | Anderson | 235—176 |
| 3,070,783 | 12/1962 | Pohm | 340—174 |
| 3,092,812 | 6/1963 | Rossing et al. | 340—174 |
| 3,124,490 | 3/1964 | Schmeckenbecher | 148—31.55 |
| 3,140,478 | 7/1964 | Marette et al. | 340—345 |

ROBERT C. BAILEY, *Primary Examiner.*

WALTER W. BURNS, Jr., MALCOLM A. MORRISON, *Examiners.*